United States Patent [19]

Born et al.

[11] Patent Number: 4,819,561
[45] Date of Patent: Apr. 11, 1989

[54] SENSOR FOR ATTACKING HELICOPTERS

[75] Inventors: Gunthard Born, Munich; Gunther Sepp, Ottobrunn, both of Fed. Rep. of Germany

[73] Assignee: Messerschmitt-Bölkow-Blohm GmbH, Munich, Fed. Rep. of Germany

[21] Appl. No.: 154,805

[22] Filed: Feb. 11, 1988

[30] Foreign Application Priority Data

Dec. 3, 1987 [DE]   Fed. Rep. of Germany ....... 3707888

[51] Int. Cl.⁴ .............................................. F42C 13/02
[52] U.S. Cl. .................................................. 102/213
[58] Field of Search ......................... 102/212, 213, 214

[56] References Cited

U.S. PATENT DOCUMENTS

| 4,160,415 | 7/1979 | Cole | 102/214 |
| 4,242,962 | 1/1981 | Wakeman et al. | 102/213 |
| 4,409,900 | 10/1983 | Currie | 102/213 |
| 4,444,110 | 4/1984 | Lindner et al. | 102/213 |

FOREIGN PATENT DOCUMENTS 2133514  7/1984  United Kingdom ................ 102/213

Primary Examiner—Charles T. Jordan
Attorney, Agent, or Firm—Kenyon & Kenyon

[57] ABSTRACT

The invention relates to a sensor for use in the warhead of a missile, which can be used against helicopters, in that it is equipped with one or more high-resolution LRFs with respect to space and time, which identifies the helicopter on the basis of the common arrangement and size of the detected rotor blade selections with a numerical processor and activates an ignition device accordingly.

21 Claims, 3 Drawing Sheets

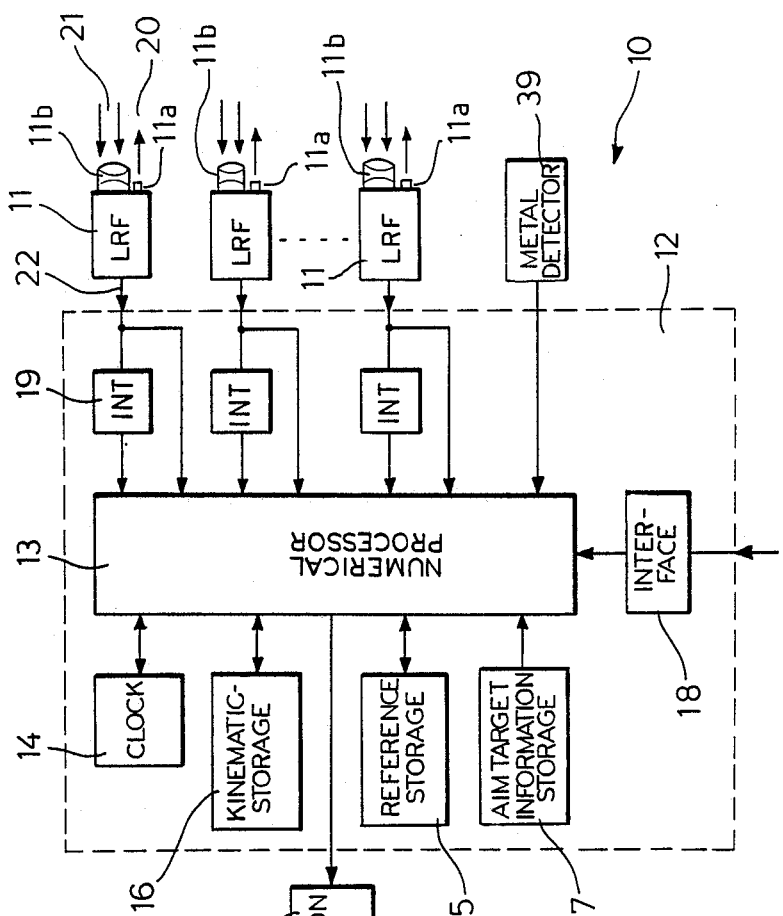
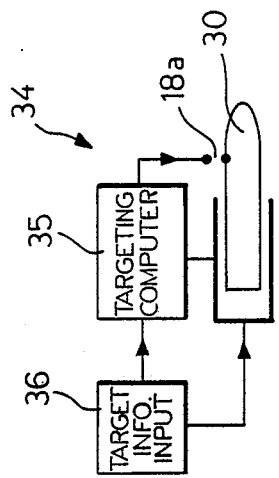
FIG. 3
FIG. 5

SENSOR FOR ATTACKING HELICOPTERS

BACKGROUND AND SUMMARY OF THE INVENTION

The invention is directed to a sensor for use in the warhead of a missile launched for an attack on a helicopter positioned on or near the ground surface.

An active optical sensor is known for discriminating enemy targets from surrounding objects. Such an active optical sensor is capable of differentiating helicopters, vehicles, tanks etc. from ground and ground vegetation and triggering an ignition accordingly. This is achieved in that the tramsmitter beam, as well as the receiver beam, is bundled in the centimeter or millimeter range and the time resolution lies in the nanosecond range or the target surface is scanned with a high repetition frequency.

This known sensor, while having been tried and proven effective, is, however, for so-called approach sensors for use in warheads of missiles specifically targeted against helicopters and is generally unsuitable for use as its costs are far too expensive.

The present invention is based on the task of creating a sensor of the initially mentioned kind, with which a missile, for example, a grenade, can be used for attack on a helicopter, detected on or near ground level, without the sensor responding to other apparent targets such as trees, bushes, rocks, huts, etc. Generally, the present invention includes a sensor in a warhead of a missile, which sensor comprises at least one high-resolution laser range finder (LRF) which is inclined forward in the direction of flight and one evaluation circuit which includes a clock and a processor. The LRF is operable to direct signals forwardly of the missile. The signals scattered back to the sensor by the rotor blades of the helicopter are compared by the processor to "velocity/-flying time profile" data and reference pattern data. The data comparison, together with a measurement of time elapsed since the launching of the missile, enables the processor to determine the presence, direction, range, position and type of helicopter and to activate an ignition accordingly.

Reference should now be made to the following detailed description and to the accompanying drawings, in which:

BRIEF DESCRIPTION OF THE DRAWINGS

FIG. 3 is a block diagram of the sensor of the present invention in schematic form.

FIG. 4b is a diagram of the corresponding intensity signal I(t) according to FIG. 4a.

FIG. 5 is a block diagram of the launching installation with interface.

DETAILED DESCRIPTION

Starting from the problem that heretofore known flyby sensors cannot differentiate sufficiently, on an active optical base, between a plane or tank and a bush of similar dimensions, the present invention provides a way of solving this problem reliably. Primarily considered here is an attack on helicopters, which not only actively and successfully support infantry in battle, but also tank units. In this application, they fly close to the ground and largely under cover of nearby bushes and trees, which represent false targets and, therefore, cause a high probability of random discharges in an attack on the helicopter.

Figure 1:
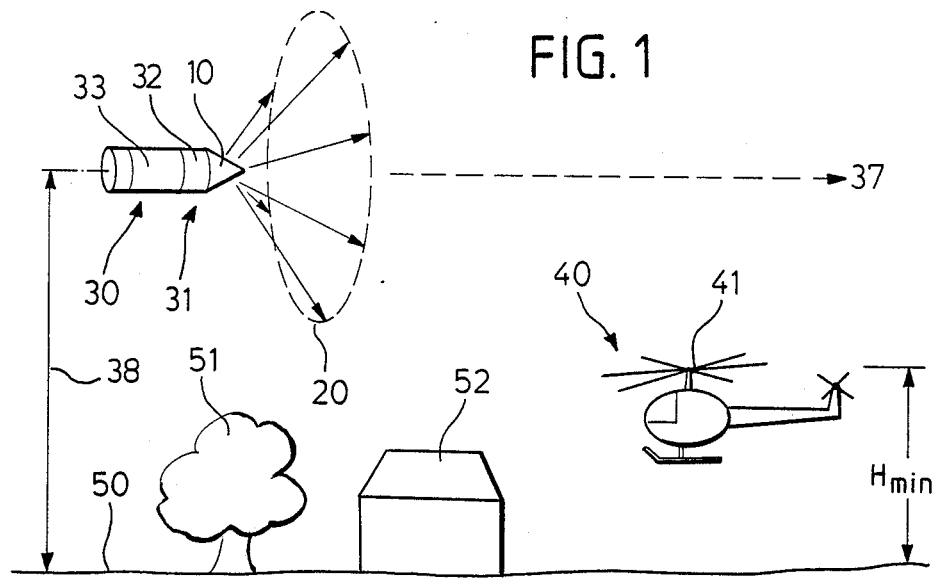
FIG. 1 is a schematic illustration of a position-finding grenade during flight above the ground.

In this regard, the invention provides a solution in that, as shown in FIG. 1, the projectile 30, for example, a grenade, includes a plurality of LRFs 11 arranged on the circumference of its warhead 31 and inclined in the forward direction, to transmit signals 20 forwardly of the missile 30. The signals 21 (see FIG. 2 and 3) scattered back by the rotor blades 42 of a helicopter 40 create an appearance image which is compared by an evaluating unit 12 with reference images of all known helicopter types stored in the evaluating unit 12. If necessary, the evaluating unit 12 converts the received information into an ignition signal for an ignition unit 32 of the projectile 30. Since the rotor blades 42 move most often in the horizontal plane and the flight path 37 of the missile 30 likewise proceeds approximately horizontally, the signals 22, represented as signal intensity I(t) 22b (FIG. 4b) and distance R(t) 22a (FIG. 4a), yield given sections 26 of approximately identical distance 25, which correspond to the scanned rotor blades 42 of the helicopter 40, and interposed sections 27 of greater distance, which correspond to the distance to the ground 50 in the interspace between the rotor blades 42 (see graphs of FIGS. 4a, 4b). Since these measured sections represent significant characteristics of the helicopter 40, they can readily and reliably be drawn on for an identification of the type of helicopter through pattern recognition with reference images stored in a reference storage 15.

Referring now to FIG. 3, the sensor structure is shown schematically in a block diagram. The laser range finder units (LRF) 11, which preferentially work with a CW semiconductor laser and the known phase measuring method, each generate a tightly bundled scanning beam 20 which comprises a high measuring speed, high range precision, position-finding beam 20, which is transmitted via transmitter optics 11a forwardly of the missle 30. Receiver optics arrangements 11b receive the signal beam 21 scattered back by the helicopter rotor blades 42. If the transmitted beam 20 impinges on the rotor blades 42 of the helicopter 40, the detected sections 26, 27 (FIG. 2) are supplied to the evaluating unit 12, which compares the signal 21 with the reference images in the reference storage 15 by means of a numerical processor 13 coupled to the reference storage 15 and LRFs 11. Upon a completed identification, the ignition unit 32 is activated.

Figure 4A:
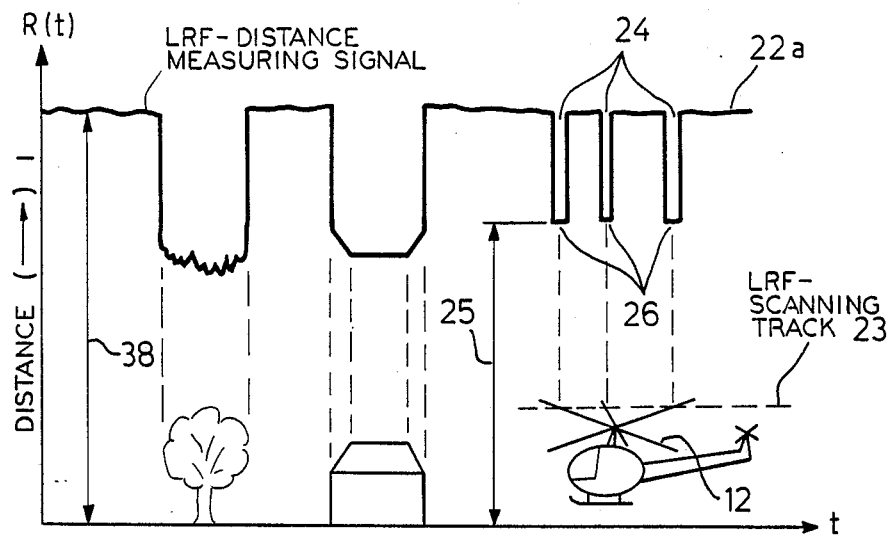
FIG. 4a is a diagram of the distance signal R(t) of the sensor as results from the representation of FIGS. 1 and 2.
Figure 4B:
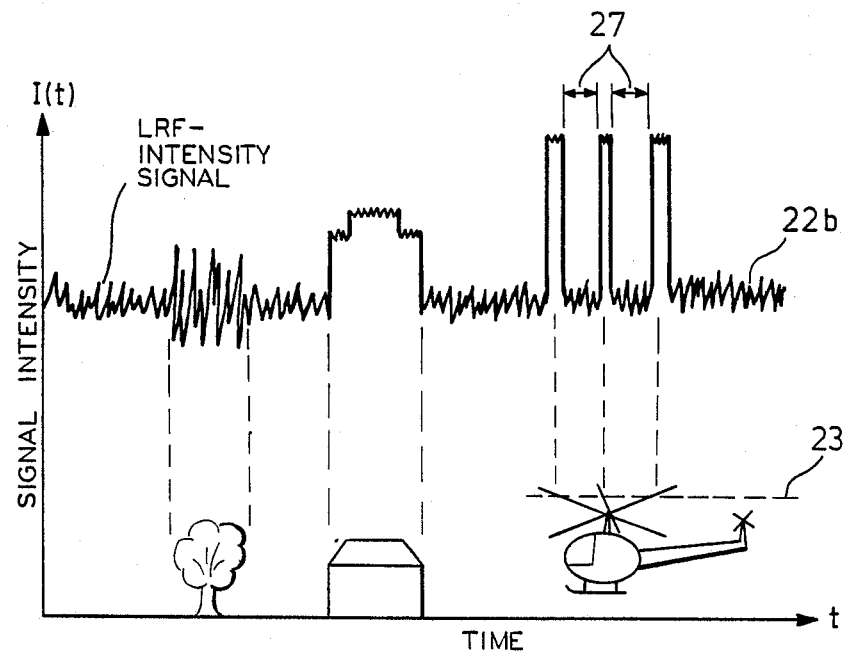

FIG. 4a and 4b illustrate the response of the LRF signal 22 during flight-over of the missile 30 over the terrain shown schematically in FIG. 1. It can be clearly recognized that, for example, the signatures of tree 51 and house 52 are similar to each other. This would ordinarily apply to the signal reflected back by the helicopter 40. However, pursuant to the present invention, the utilization of high-precision LRFs 11 enables the detection of the signal scattered back by the rotor blades 42, which may be used for helicopter identification. This also renders ineffective the tactic employed until today, i.e. largely camouflaging helicopters, which in battle fly most often barely above the ground 50, through trees or bushes, and use these trees and bushes as "cover" so that they serve to mask a true signal and so give off a "faked signal" for triggering weapons.

For pattern recognition, the numerical processor 13 identifies a helicopter type for each LRF 11, that is, for each scanning track 23, if the signals 22, in each instance, fulfill all or at least several of the following target criteria:

1. Are at least one or several short range jumps 24 of at least Hmin present? Hmin here is the range jump from ground 50 to rotor 41 of helicopter 40 hovering or flying at minimum altitude, that is, Hmin, by considering the forward inclination of the LRF 11, is somewhat larger than the overall height of the helicopter 40. If this criterium applies, then the scanning beam 20 of the LRF 11 could have impinged on one or several helicopter rotor blades 42.

2. Are at least two ranges 25 of the range jumps 24 measured approximately equal? In this case the measured objects lie on a straight line approximately parallel to the flight path 37 of the missile 30. Since the rotor 41 of a slowly flying helicopter 40 rotates approximately horizontally and the flight path 37 of themissile 30 fired onto a low-flying helicopter 40 extends also approximately horizontally, the measured objects are with still higher probability two or several rotor blades 42 of a helicopter 40.

3. Are the laser intensities I(t) scattered back by the assumed rotor blades 42 approximately equal? If this criterium is fulfilled, then a very high probability is given that these are rotor blades 42, for these are all identical.

4. Do these laser intensities I(t) show the same uniform time response? This too results from the homogeneity of the surface of a rotor blade 42. Leaves or other natural surfaces show noticeable structuring and, hence, upon scanning show intensity fluctuations (see FIG. 4b).

5. Are the measured lengths of the assumed rotor blade sections 26 and the interposed sections 27 with greater distance (to the ground 50 or, when scanning near the rotor center 43, to the helicopter fuselage 44) compatible in terms of numbers with a possible scanning track 23 of a possible helicopter type?

If all of these target criteria apply within a narrow error bandwidth, then, with a probability bordering on certainty, a helicopter 40 has been discovered. As a rule, however, a sufficiently high target probability is given even if greater error bandwidth is used, or if only several of these target criteria are fulfilled.

For checking the last target criterium, which ascertains the geometry of the rotor 41, the numerical processor 13 retrieves for each stored helicopter type the length, width, and number of rotor blades 42. With simple algebraic trigonometric calculations it can be demonstrated whether a given rotor type has been scanned or not and how possibly the scanning track 23 proceeds with respect to the rotor center 43. The absolute lengths 26 of the scanned objects are obtained from the instantaneous flying speed v of the missile 30 and time t. The instantaneous flying speed is determined by the processor 13 approximately from function v(t) stored in the kinematics storage 16 typical for the missile 30, from the likewise stored launching time and from the time elapsed since then, measured with the clock 14.

The findings gained in this way of the relative position of the scanning track 23 with respect to the rotor 41 are, according to the invention, used for increasing the hit effectivity. To accomplish this, one of the known methods for directed explosion of the warhead 31 is used, for example, ignition of the specifically formed charge at a given location. The optimum effective direction is that toward the fuselage 44 or to a point between fuselage center and rotor center 43. The optimum ignition time is given by the relative position of the missile 30 and helicopter 40 at the time of the target identification, as well as the velocity of the missile 30 and the effective parts of the warhead 31 after the explosion. The forward inclination of the LRFs 11 is optimized according to these view points under consideration of the processing speed of the evaluating unit 12. The distance of the optimum target point from the rotor center 43 is again retrieved by the numerical processor (13) from the reference storage 15. The rotor center 43 can initially, for reasons of symmetry, run mirror image-like with respect to the scanning track 23 on both sides. If, however, the scanning tracks 23 of two LRFs 11 extend across the motor, then the position of the rotor center 43 is definitely established. This non-ambiguity can, nevertheless, be obtained also with only one scanning track 23, if the scanning track runs also across the fuselage 44 of the helicopter 40, which means, the LRF scanning beam 20, for example, impinges obliquely from above. Here, the numerical processor 13 can even ascertain whether or not the measured range jump 24 between rotor 41 and fuselage 44 is compatible with the geometry of the helicopter 40, which means, whether this is, in fact, the fuselage 44, if its geometry is also contained in the reference storage 15.

Figure 2:
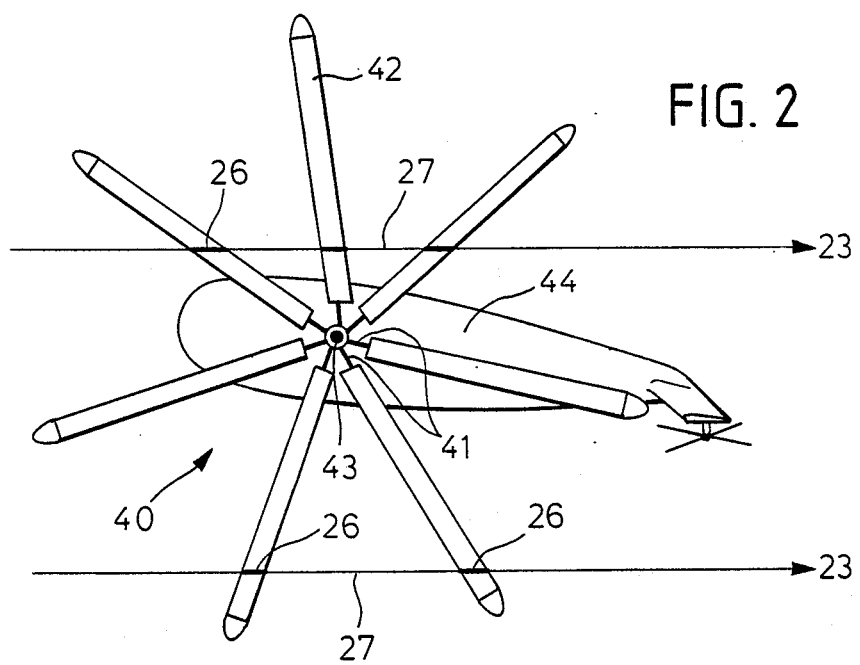
FIG. 2 is a schematic view from above of a helicopter, as detected by the sensor of the approaching grenade, together with the view from above as seen by the human eye.

Up to now the assumption was made that the flight path 37 of the missile 30 lies above the helicopter 40 (FIGS. 1, 2, and 4). If the missile flies through below the helicopter, target detection becomes even simpler yet, since an object, which a LRF 11 looking upward from the typical flying altitude of the missile 30 recognizes, is with certainty not an apparent target (tree, bush, etc.), but, in fact, a helicopter 40. In this case, the target criteria can, hence, be drastically simplified.

In order to determine the viewing direction of a LRF 11, its signals 22 are integrated by an integrator 19. This does, in fact, slow down the measuring speed, that is, indicates only a mean range. However, it also enlarges the range of LRF 11 and adapts it to the typical flying altitude of the missile 30. This permits recognition of the viewing direction 20 of LRF 11 to the ground 50 or into the sky. For a rolling missile 30, the numerical processor 13 calculates additionally the instantaneous viewing direction 20 from the time extrapolation of the periodically changing average ranges R(t) to the ground 50, and the course of the rolling frequency typical for the missile 30 (for example, steadily decreasing) is derived from these ranges R(t) or retrieved from the kinematics storage 16 and processed.

If one takes into consideration that most helicopters have four to seven rotor blades 42, and if one assumes, for example, in the case of a non-rolling missile 30, two LRFs 11, and in the case of a rolling missile 30, six LRFs 11, it can be recognized that the suggested sensor 10 in most situations encountered has a very high trigger probability and a very low random triggering probability. In the minority of cases, in which only one single object is scanned and identified as potential rotor blade 42, the random triggering probability does increase, the trigger probability, however, remains on its high level. In these or in the even rarer cases, when no rotor blade 42, but only the helicopter fuselage 44, is scanned, or when the off-position of the missile 30 is too great for a sufficiently precise measurement, or for other reasons, the direction to the optimum target point cannot be definitely determined, the numerical processor 13, instead of the directed ignition, triggers a non-directed ignition, that is, an isotropic warhead explosion.

In order to further decrease the random triggering probability of the sensor 10 and to simplify the process of pattern recognition, additional measures according to the invention are taken (see FIG. 5). Thus, the launching installation 34 and the missile 30 are provided with an interface 18, for example, in the form of an electrical contact 18a, across which a, for example, serial data transmission before or during the launching tramsits data to the numerical processor 13, which contains previously known findings regarding the target. These findings can have been gained from the target device 35 or they can have been input by the gunner through the input 36. If, for example, the approximate distance range of the target is known and transmitted to the numerical processor 13, it blocks the ignition unit 32 up to this point and so avoids potential random triggering before.

If the type of the helicopter target is known and transmitted before the launch to the numerical processor, then it only needs to activate one single reference pattern. Given sufficient previous knowledge regarding target type, target range and target environment, it can even be an advantage, to soften the target criteria across the interface 18, that is, to increase the permissible error bandwidth and to decrease the requisite number of simultaneously applicable target criteria, in order to increase even further the trigger probability without the random triggering probability becoming too high.

Across the interface 18, of course, additional findings, here not considered separately, can be introduced like, for example, the small angle between flight path 37 of the missile 30 and the rotor plane to be expected in the target range, which results with increasingly sloping terrain or upon fast forward flight or forward acceleration of the helicopter 40.

If the sensor 10, upon exceeding the target distance range or upon falling below the minimum flight altitude Hmin of the missile 30, has not recognized a helicopter 40, that is, a primary target, it automatically is switched to secondary targets. To this end, the numerical processor 13 activates the patterns of tanks and vehicles as well as correspondingly changed, most often simplified target criteria, additionally contained in the reference storage 15.

Lastly, the warhead 31 is also equipped with a conventional metal sensor 39, which activates the ignition unit 32 in a flyby in the immediate vicinity of the helicopter 40, that is, at a distance of up to 1-2 m. The processor 13 directs the effective direction of the warhead 31 into the direction of the smallest distance measured with one of the LRFs 11.

The flying velocity of a grenade 30 lies in the range of a multiple of the speed of sound while the blade tip velocity of the rotor blades 42 lies in the range below the speed of sound, so that the so-called "blurring" of the target image is negligible. If the missile under consideration is a slow missile 30, for example, a flying body directed by glass fiber or laser guide beam, then, in the reference storage 15, additionally the typical speed ranges and the direction of rotation of the helicopter rotor 41 are stored and taken into consideration for pattern recognition.

What is claimed is:

1. A sensor for use in a warhead of a missile, which missile is launched for an attack against a helicopter, said sensor comprising:
    (a) at least one laser range finder (LRF) having high resolution in respect of time and space for generating first signals,
    (b) said at least one laser range finder being mounted on said missile at a position inclined forwardly in the direction of flight of said missile,
    (c) transmitter means coupled to said laser range finder for transmitting said first signals forwardly of said missle for scattering off objects,
    (d) receiving means for receiving second signals, said second signals comprising the reflection of said first signals scattered back from an object,
    (e) an evaluation unit coupled to said receiving means for processing said second signals,
    (f) said evaluation unit including a numerical processor and a clock,
    (g) said numerical processor being coupled to a reference storage storing reference patterns and to a kinematics storage storing a velocity/flying time profile,
    (h) said numerical processor being operable to process said second signals in relation to said reference patterns, said velocity/flying time profile and an elapsed time measurement of said clock to determine characteristics indicative of a helicopter and to determine the direction, range, position, presence and type of said helicopter.

2. The sensor of claim 1, wherein said reference storage stores information relating to the number, length and width of the rotor blades of different types of helicopters.

3. The sensor according to either of claims 1 or 2, wherein said numerical processor processes said second signals to determine signals scattered back by a helicopter by determining target criteria including:
    (a) if said second signals indicate at least two or more range jumps of at least a minimum height (Hmin),
    (b) if at least two object ranges occurring during said range jumps are approximately equal,
    (c) if intensities I(t) are approximately equal,
    (d) if said intensities I(t) exhibit a uniform time response, and
    (e) if lengths and distances of the objects indicated according to (b) correspond sufficiently to information of a possible scanning track of a rotor of a helicopter type stored in said reference storage.

4. The sensor of claim 3, wherein said numerical processor processes the target criterium according to 3(e) by algebraic calculations based upon lengths and distances determined by 3(e) and length, width and number of the rotor blades of a particular helicopter type stored in said reference storage, calculates the position of the rotor center and selectively activates an ignition unit.

5. The sensor of claim 1, wherein an integration means is coupled between said at least one laser range finder and said numerical processor to increase the range of said at least one laser range finder to at least a typical flying altitude of said missile.

6. The sensor of claim 5, wherein said numerical processor calculates from the time response of said second signals, after processing by said integration means, the instantaneous average flying altitutde of said missile above ground and the particular viewing direction of said at least one laser range finder.

7. The sensor of claim 5, wherein said numerical processor determines from the position of the rotor center of said helicopter and from the viewing direction of said at least one laser range finder, the distance of said missile to the center of the fuselage of said helicopter.

8. The sensor of claim 4, wherein:
(a) said missile includes a warhead having a directable charge, and
(b) said numerical processor being operable to direct said charge and activate said ignition unit in accordance with the range, position and direction determination of 1(h).

9. The sensor of claim 1, wherein said missile is housed in a launching installation prior to launching and an interface is electrically coupled between said missile and said launching installation for data transmission to said sensor before or during launching.

10. The sensor of claim 9, wherein said interface for data transmission is a serial interface.

11. The sensor of claim 9, wherein information of a known target distance range is transmitted through said interface to said sensor.

12. The sensor of claim 4, wherein activation of said ignition unit is blocked before reaching a predetermined target distance range.

13. The sensor of claim 9, wherein a preselection of predetermined reference patterns stored in said reference storage is transmitted across said interface to said sensor for subsequent pattern recognition by said numerical processor.

14. The sensor of claim 1, wherein said reference storage stores reference patterns of tanks and vehicles.

15. The sensor of claim 14, wherein said sensor compares said second signals to said reference patterns of tanks and vehicles upon the occurrence of predetermined conditions.

16. The sensor of claim 9, wherein information on target criteria is transmitted through said interface to said sensor.

17. The sensor of claim 8, wherein said warhead includes a metal sensor ot selectively activate said ignition unit.

18. The sensor of claim 2, wherein said reference storage stores information relating to the typical speed range and the direction of rotation of different types of helicopters.

19. The sensor of claim 2, wherein an integration means is coupled between said at least one laser range finder and said numerical processor to increase the range of said at least one laser range finder to at least a typical flying altitude of said missile.

20. The sensor of claim 19, wherein said numerical processor calculates from the time response of said second signals, after processing by said integration means, the instantaneous average flying altitude of said missile above ground and the particular viewing direction of said at least one laser range finder.

21. The sensor of claim 19, wherein said numerical processor determines from the position of the rotor center of said helicopter and from the viewing direction of said at least one laser range finder, the distance of said missile to the center of the fuselage of said helicopter.

* * * * *